United States Patent
Yuan et al.

(10) Patent No.: US 7,468,986 B2
(45) Date of Patent: Dec. 23, 2008

(54) VIRTUAL INTERWORKING TRUNK INTERFACE AND METHOD OF OPERATING A UNIVERSAL VIRTUAL PRIVATE NETWORK DEVICE

(75) Inventors: Chin Yuan, San Ramon, CA (US); Kuo-Hui Liu, San Ramon, CA (US)

(73) Assignee: AT&T Intellectual Property I.L.P., Reno, NV (US)

( * ) Notice: Subject to any disclaimer, the term of this patent is extended or adjusted under 35 U.S.C. 154(b) by 995 days.

(21) Appl. No.: 10/298,266

(22) Filed: Nov. 15, 2002

(65) Prior Publication Data

US 2004/0095940 A1    May 20, 2004

(51) Int. Cl.
*H04L 12/66* (2006.01)
*H04L 12/28* (2006.01)

(52) U.S. Cl. .................. 370/419; 370/420; 370/390; 370/352; 370/395.5

(58) Field of Classification Search ............... 370/351, 370/468, 395.21, 395.41, 398, 352, 485, 370/486, 401, 465, 466, 467, 395.53, 395.54, 370/419, 420, 395.52, 392, 390, 396; 709/245, 709/238, 242, 227, 228
See application file for complete search history.

(56) References Cited

U.S. PATENT DOCUMENTS

| | | | |
|---|---|---|---|
| 6,597,699 B1 * | 7/2003 | Ayres | 370/400 |
| 6,633,571 B1 | 10/2003 | Sakamoto et al. | |
| 6,636,898 B1 | 10/2003 | Ludovici et al. | |
| 6,687,220 B1 * | 2/2004 | Ayres | 370/229 |
| 6,772,226 B1 * | 8/2004 | Bommareddy et al. | 709/245 |
| 7,009,983 B2 * | 3/2006 | Mancour | 370/401 |
| 7,010,002 B2 * | 3/2006 | Chow et al. | 370/485 |
| 7,072,346 B2 * | 7/2006 | Hama | 370/395.53 |
| 7,113,498 B2 * | 9/2006 | Bajic | 370/338 |
| 7,113,512 B1 * | 9/2006 | Holmgren et al. | 370/395.53 |
| 7,152,115 B2 * | 12/2006 | Ould Brahim et al. | 709/238 |
| 7,203,762 B2 * | 4/2007 | Yamada et al. | 709/238 |
| 7,242,665 B2 * | 7/2007 | Langille et al. | 370/217 |
| 7,260,648 B2 * | 8/2007 | Tingley et al. | 709/245 |

OTHER PUBLICATIONS

VPN White Paper: "VPN Technologies: Definitions and Requirements"; VPN Consortium, Jan. 2003, pp. 1-6, Jan. 2003.
E. Rosen and Y. Rekhter, Cisco Systems, Inc.; Internet Engineering Task Force (IETF); Network Working Group; Request for Comments: 2547; Category: Informational; "BGP/MPLS VPNs", pp. 1-25; URL: www.ietf.org/rfc/rfc2547.txt?number=2547, Mar. 1999.

* cited by examiner

*Primary Examiner*—Hanh Nguyen
(74) *Attorney, Agent, or Firm*—Toler Law Group (57) ABSTRACT

The present invention relates generally to a data communication system, a virtual interworking trunk interface within a device to form a universal virtual private network, and methods of operating a virtual private network. In a particular embodiment, the data communication system includes a first portion of a virtual private network, a second portion of the virtual private network, a virtual switch instance associated with the first portion of the virtual private network, a virtual router instance associated with the second portion of the virtual private network, and a virtual interworking trunk interface coupled to the virtual switch instance and to the virtual router instance.

36 Claims, 7 Drawing Sheets

VIRTUAL INTERWORKING TRUNK INTERFACE AND METHOD OF OPERATING A UNIVERSAL VIRTUAL PRIVATE NETWORK DEVICE

FIELD OF THE INVENTION

The present invention relates generally to a virtual interworking trunk interface and a method of operating a virtual private network.

BACKGROUND

In today's networking environment, there are data service customers that have equipment at many different business sites and at various locations. All of the customer's equipment may be networked by the service provider. Some of the sites may be interconnected via an internet protocol (IP) virtual private network (VPN) service (a layer 3 VPN), and other sites are interconnected through an Ethernet-based layer 2 VPN VPLS (virtual private LAN service). Regardless of the specific interconnecting technology, from the customer perspective, there is only a single virtual private network that is dedicated to the customer. To provide the customer with a single VPN view, interworking is required between the two VPNs. In addition, each of the different VPN types have both positive and negative attributes. For example, while Ethernet-based layer 2 networks provide plug-and-play advantages, it is not as scalable as IP-VPN networks and requires fiber-based transport. As another example, with layer 3 IP-VPN networks, operational scalability is hampered due to IP routing configuration requirements for each IP interface and close coordination required between service providers and customers.

Accordingly, there is a need for an interworking mechanism between layer 2 and layer 3 VPN networks and for an improved method of operating a virtual private network. However, in today's implementation, an external interworking trunk is required to interconnect a layer 2 VPN device and a layer 3 VPN device. There is no device that has implemented a mechanism to perform this interworking function inside a box. The present disclosure is intended to address this issue.

SUMMARY

The present disclosure relates generally to a data communication system, a virtual interworking trunk interface within a device to form a universal virtual private network, and methods of operating a virtual private network. In a particular embodiment, the data communication system includes a first portion of a virtual private network, a second portion of the virtual private network, a virtual switch instance associated with the first portion of the virtual private network, a virtual router instance associated with the second portion of the virtual private network, and a virtual interworking trunk interface coupled to the virtual switch instance and to the virtual router instance.

In another embodiment, a virtual interworking trunk interface within a virtual private network is disclosed. The virtual interworking trunk interface includes a first virtual interface to a virtual switch instance associated with a first portion of the virtual private network, and a second virtual interface to a virtual router instance associated with a second portion of the virtual private network.

In another embodiment, the method of operating a virtual private network includes receiving data to be communicated at a virtual switch instance associated with a first portion of the virtual private network, forwarding the data to a virtual interworking trunk interface coupled to the virtual switch instance, and forwarding the data from the virtual interworking trunk interface to a virtual router instance associated with a second portion of the virtual private network.

In another embodiment, the method of operating a virtual private network includes receiving data to be communicated at a virtual router instance associated with a second portion of the virtual private network, forwarding the data to a virtual interworking trunk interfaced coupled to the virtual router instance, and forwarding the data from the virtual interworking trunk interface to a virtual switch instance associated with a first portion of the virtual private network.

BRIEF DESCRIPTION OF THE DRAWINGS

The use of the same reference symbols in different drawings indicates similar or identical items.

DETAILED DESCRIPTION OF THE FIGURES

Figure 1:
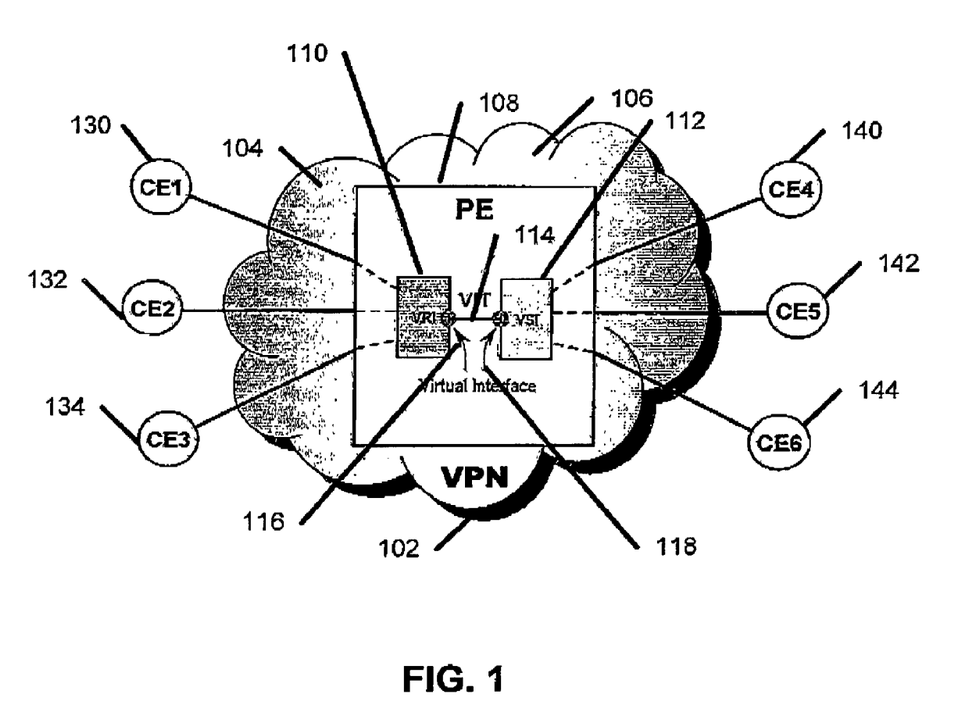
FIG. 1 is a general diagram of a universal virtual private network.

Referring to FIG. 1, a particular embodiment of a universal virtual private network (VPN) 102 is disclosed. The virtual private network 102 has a first portion 106 and a second portion 104. The first portion 106 of the VPN 102 is a Layer 2 network and the second portion 104 of the VPN 102 is a layer 3 network. The first portion 106 is an Ethernet-based switching network, and the second portion 104 is an internet protocol (IP) network. The first portion 106 of the VPN 102 includes a virtual switch instance (VSI) 112 which is coupled to a first set of customer equipment, such as CE4 140, CE5 142, and CE6 144. The second portion 104 of the VPN 102 includes a virtual router interface (VRI) 110, which is coupled to a second set of customer equipment CE1 130, CE2 132, and CE3 134. The virtual switch instance 112 is coupled to the virtual router instance (VRI) 110 via a virtual interworking trunk (VIT) 114. The virtual switch instance 112 is coupled to the virtual interworking trunk 114 via a first virtual interface 118, and the virtual router instance is coupled to the virtual interworking trunk 114 via a second virtual interface 116. The second virtual interface 116 on the VRI 110 is treated no differently from other terminated interfaces from the perspective of the customer equipment 130, 132 and 134 within the second portion 104 of the virtual private network 102. Similarly, the first virtual interface 118 on the VSI 112 is treated in a similar manner as other terminated interfaces from the perspective of the customer equipment 140, 142, and 144, within the first portion 106 of the virtual private network 102. The VRI 110, the VSI 112, and the VIT 114 may be included within a provider edge (RE) device 108. In a particular illustrative embodiment, a data communication system may be provided that may include a first portion of the VPN 102, a second portion of the VPN 102, the VSI 112 associated with the first portion of the VPN 102, the VRI 110 associated with the second portion of the VPN 102, and the VIT interfaces 116 and 118 coupled to the VSI 112 and to the VRI 110 within the PE device 108.

Figure 2:
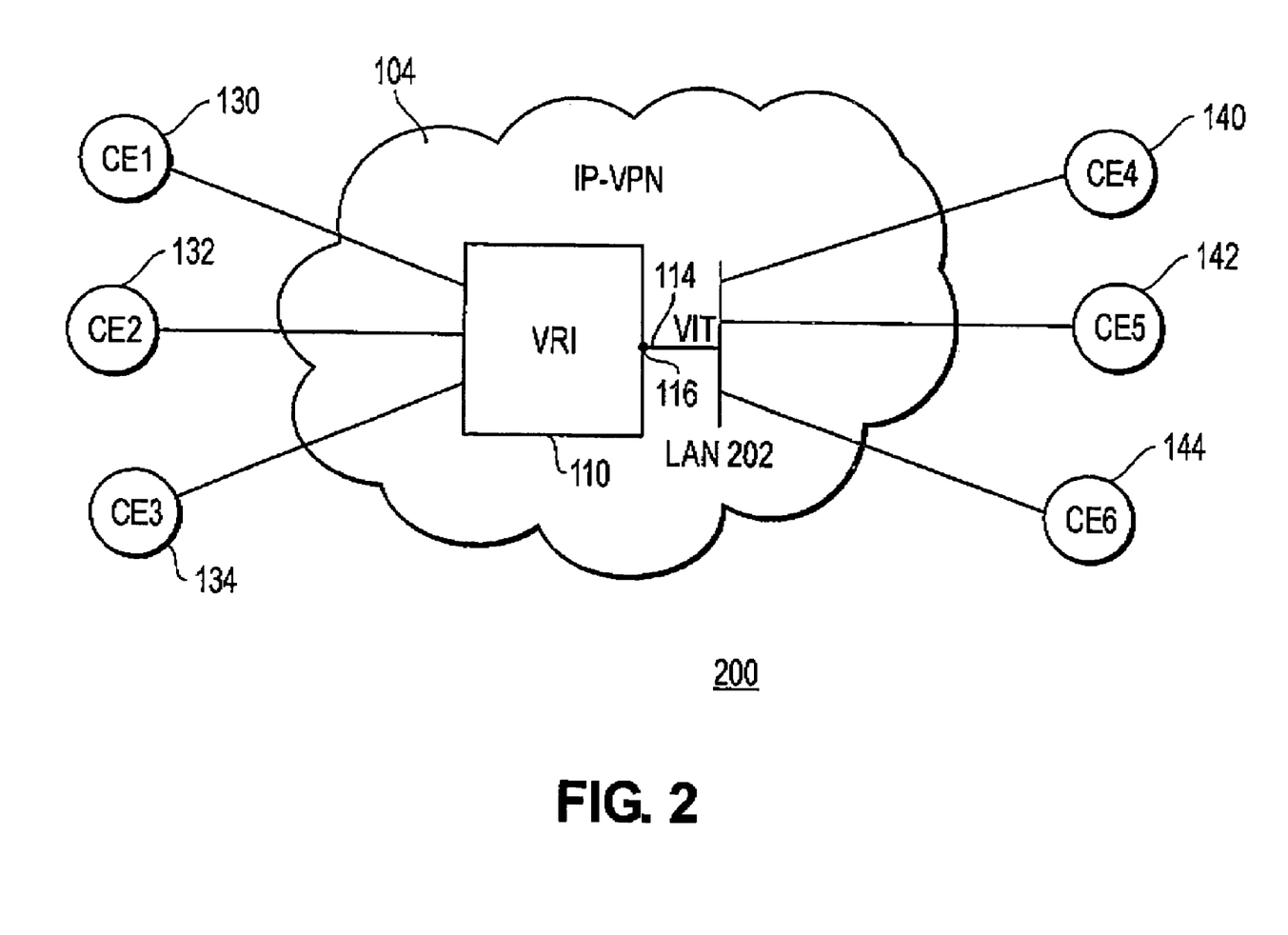
FIG. 2 is general diagram that further illustrates the universal virtual private network of FIG. 1.

Referring to FIG. 2, a portion 200 of a virtual private network is illustrated. In this particular illustrated embodiment, the second virtual interface 116 on the VRI 110 represents the internet protocol (IP) subnet of the virtual switch instance (VSI) in the VPLS cloud. The VPLS network is illustrated as LAN 202 in FIG. 2. Thus, an equivalent internet protocol virtual private network (IP-VPN) corresponding to a portion of VPN 102, is illustrated.

Figure 3:
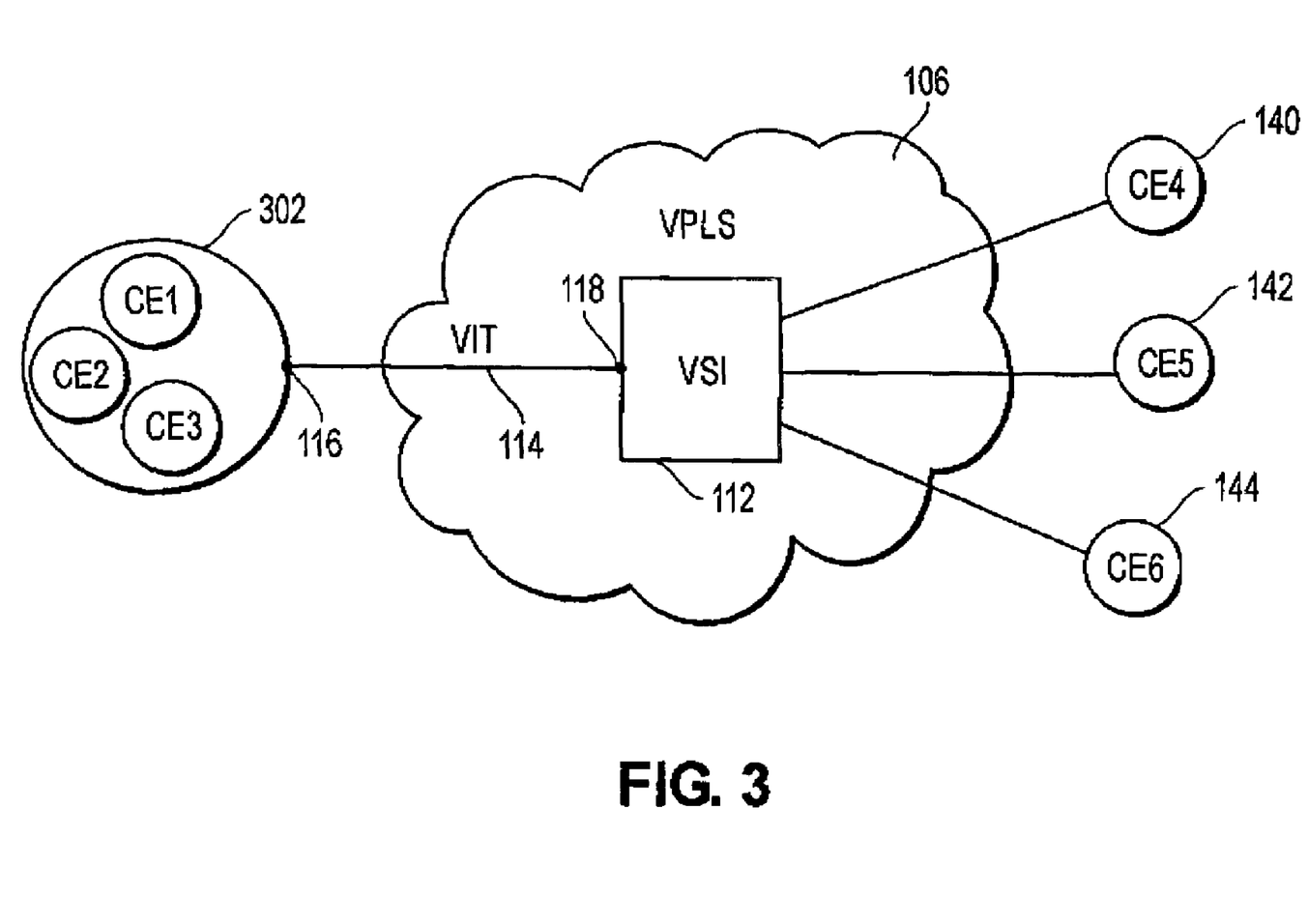
FIG. 3 is a general diagram that further illustrates the universal virtual private network of FIG. 1.

Referring to FIG. 3, further details regarding the first virtual interface 118 on the VSI 112 is illustrated. The first virtual interface 118 on the VSI 112 represents an attached shared virtual customer equipment node 302, which includes all of the customer equipment (CE1, CE2, CE3) on the particular VRI 110. Thus, FIG. 3 illustrates an equivalent VPLS network corresponding to a portion of VPN 102.

Figure 4:
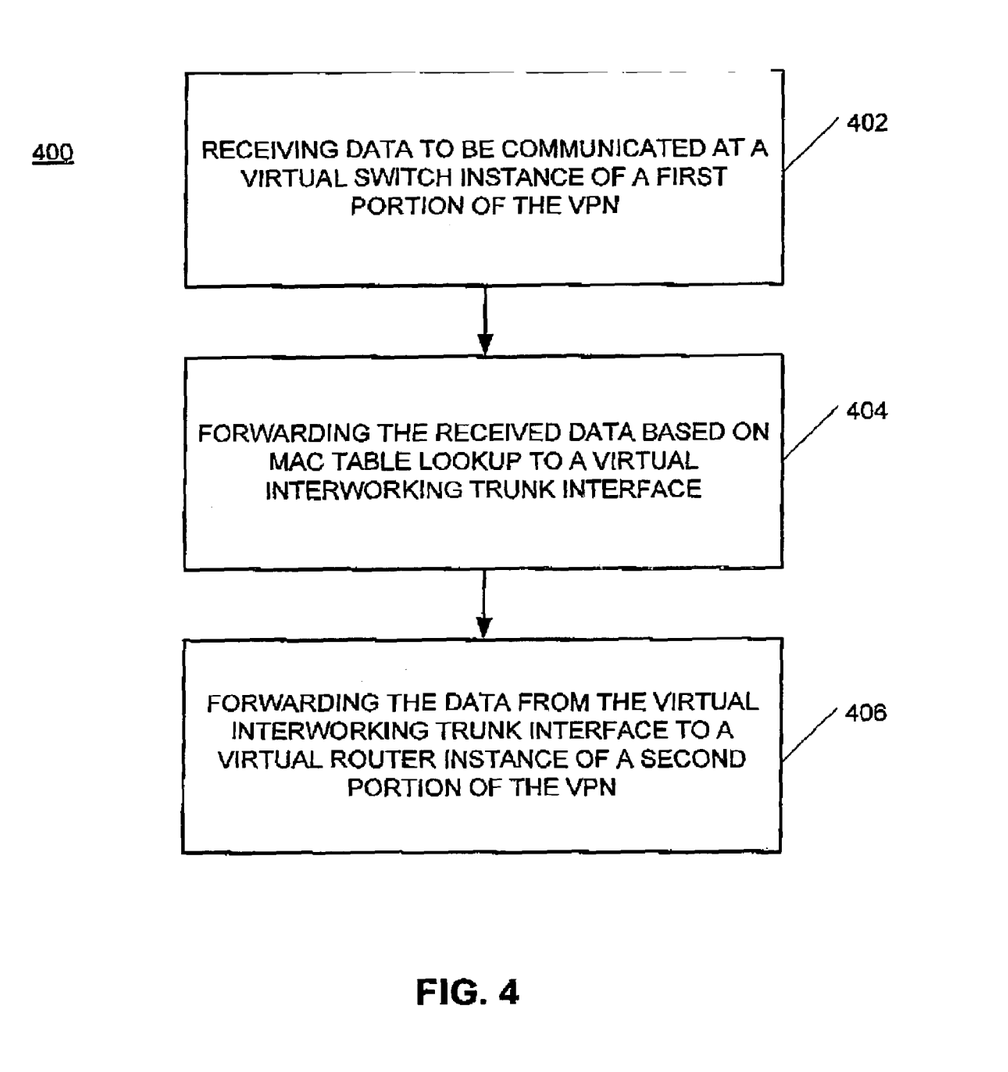
FIG. 4 is a flow chart that illustrates operation of a virtual private network.

Referring to FIG. 4, a method of operating a virtual private network is illustrated. The method describes data transfer for data that begins at the first portion 106 of the VPN 102 and is passed to the second portion 104 of the VPN 102 over the virtual interworking trunk 114. Data to be communicated is received at a virtual switch instance, such as VSI 114 of a first portion 106 of a VPN 112, at 402. The received data is forwarded based on a medium access control (MAC) table lookup to a virtual interworking trunk interface, at 404. The data from the virtual interworking trunk interface is forwarded to a virtual router instance of a second portion of the VPN, at 406. For example, the virtual interworking trunk interface may be virtual interworking trunk interface 116 on the VRI 110.

Figure 5:
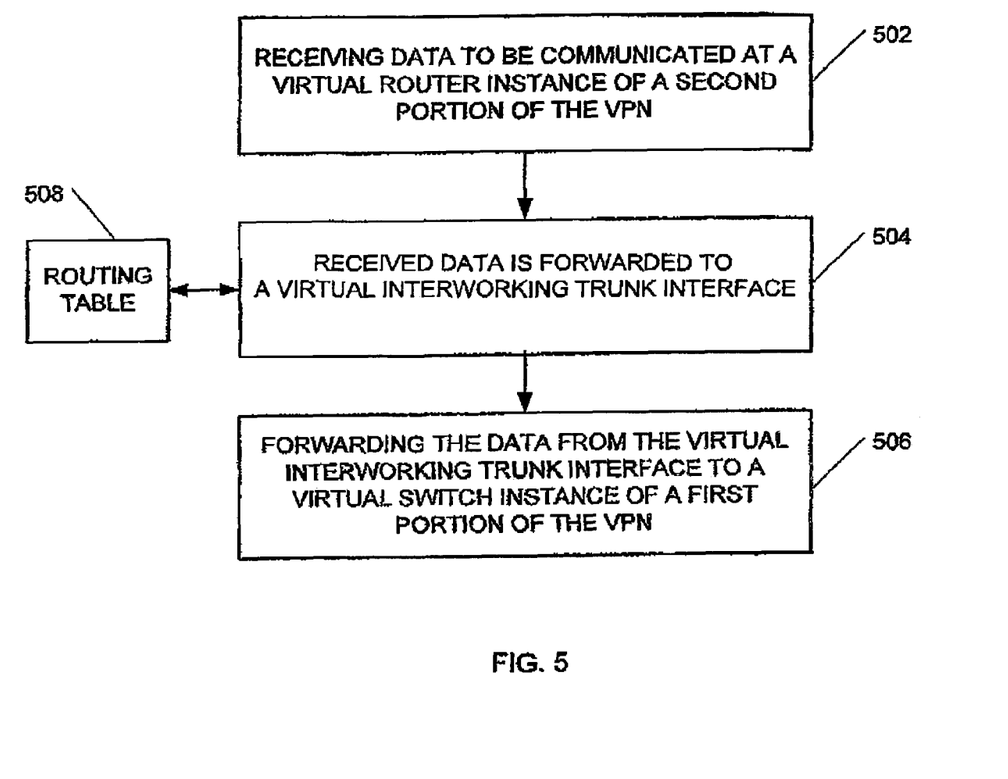
FIG. 5 is a flow chart that illustrates operation of a virtual private network.

Referring to FIG. 5, a method of operating the VPN 102 where data is communicated from the second portion 104 of the VPN 102 to the first portion 106 of the VPN 102 is illustrated. Data to be communicated at a virtual router instance of a second portion of the VPN is received, at 502. The received data is forwarded, based on a routing table lookup, to a virtual interworking trunk interface, at 504. A routing table 508 is present and can be accessed at step 504 of the method in order to obtain an entry to determine proper routing of the data. The data from the virtual interworking trunk interface is forwarded to a virtual switch instance of a first portion of the VPN, at 506. In a particular example, the virtual interworking trunk interface may be the first interface 118 on the virtual switch instance 112.

Figure 6:
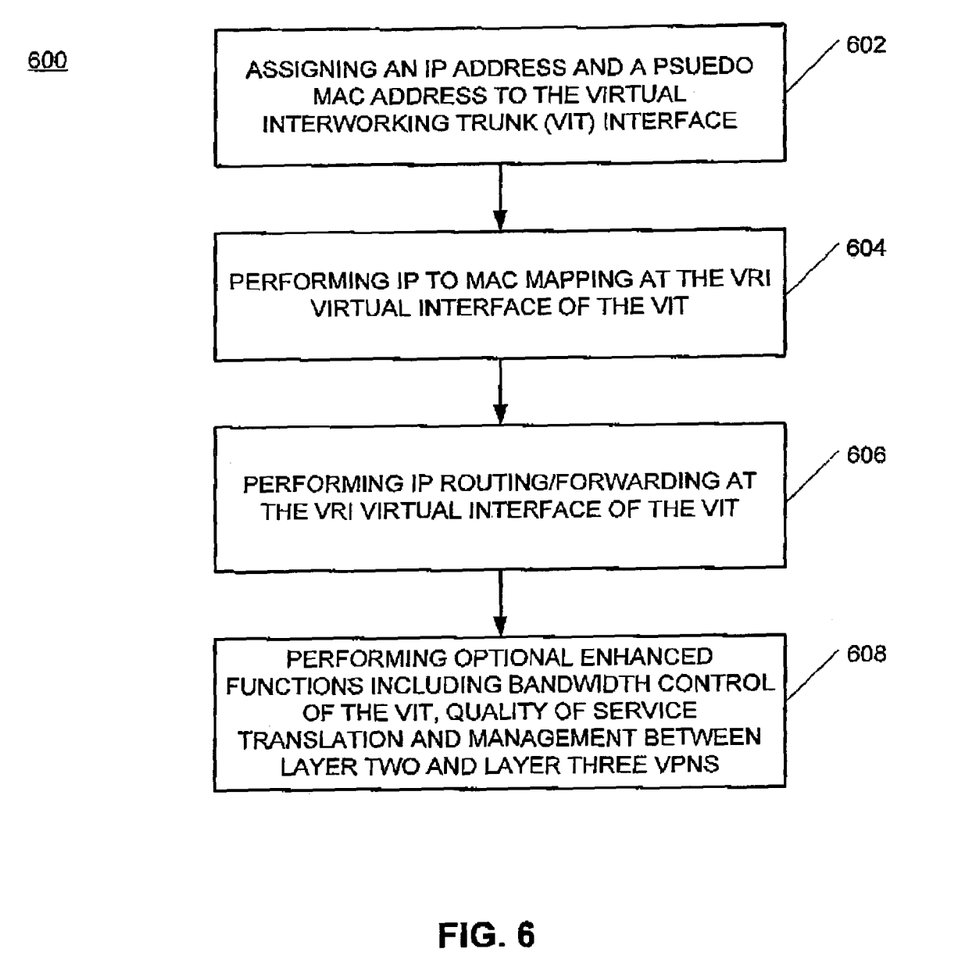
FIG. 6 is a flow chart that illustrates further detailed operation of an interface to a virtual router instance of a virtual private network.

Referring to FIG. 6, operation of the virtual private network 102 will be described. An IP address and a Psuedo MAC address is assigned to the virtual interworking trunk interface, at 602. IP to MAC mapping is then performed at the virtual router instance interface of the virtual interworking trunk, at 604 in order to communicate with CE4 140, CE5 142, and CE6 144. IP routing/forwarding is performed at the VRI virtual interface of the virtual interworking trunk, at 606 in order to communicate with CE1 130, CE2 132, and CE3 134. Optional enhanced functions may also be performed including bandwidth control of the virtual interworking trunk and quality of service translation and management between layer 3 and layer 3 VPNs, at 608.

Figure 7:
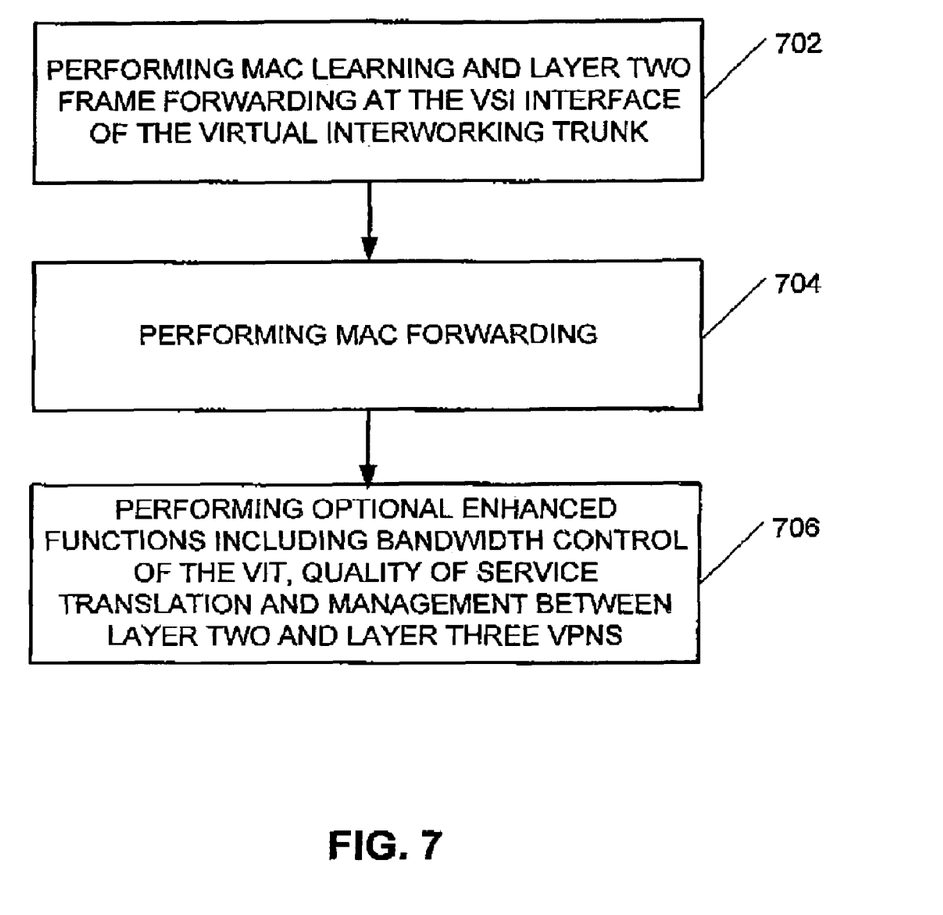
FIG. 7 is a flow chart that illustrates further detailed operation of an interface to a virtual switch instance of a virtual private network.

Referring to FIG. 7, a method of operating at a virtual interface of the VSI instance is illustrated. MAC learning and layer 2 frame forwarding is performed at the VSI interface of the virtual interworking trunk, at 702. MAC forwarding is performed at 704. Optional enhanced functions may also be performed including bandwidth control and quality of service translation and management, at 706.

The disclosed virtual private network system and method of operation has many benefits. For example, the disclosed system provides cost savings for the service provider when interworking between layer 2 and layer 3 networks. The system saves at least 2 physical ports and the associated transport facility by removing the requirement for a physical interworking trunk. The disclosed system also provides cost savings for the customer because each customer site can be connected to a nearest service provider point of presence using layer 2 or layer 3 VPN depending on availability. Instead of back-hauling to a specific point of presence to access specialized layer 2 or layer 3 equipment, in this scenario interworking can be performed at the best chosen point in the network. The disclosed system further offers service providers a flexible and scalable method to enhance their VPN services by using a hybrid layer 2/layer 3 VPN.

VPN customers are also provided a flexible solution to integrate and scale their VPNs in a manner that takes into account support for legacy networks, such as routers that cannot be configured as bridged interfaces and various technologies to handle bridging layer 2 and layer 3 VPNs. In addition, the disclosed system provides a benefit that customers do not need to change their existing customer equipment router configurations when such routers join VPNs. Thus, the amount of routing configuration coordination between customers and the service provider is advantageously reduced. Accordingly, the disclosed system and method provides a cost effective solution to effectively combine advantages of Ethernet based layer 2 VPN and layer 3 IP-VPN, while avoiding several of their disadvantages.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description

What is claimed is:

1. A data communication system comprising:
   a first portion of a virtual private network;
   a second portion of the virtual private network;
   a virtual switch instance associated with the first portion of the virtual private network;
   a virtual router instance associated with the second portion of the virtual private network; and
   a virtual interworking trunk interface coupled to the virtual switch instance and to the virtual router instance, wherein the virtual interworking trunk interface is assigned an internet protocol address and a pseudo-medium access control (MAC) address;
   wherein the virtual switch instance, the virtual router instance and the virtual interworking trunk interface are within a device.

2. The data communication system of claim 1, wherein the first portion of the virtual private network is a layer two network and the second portion of the virtual private network is a layer three network.

3. The data communication system of claim 2, wherein the first portion of the virtual private network is an Ethernet switching network and the second portion of the virtual private network is an internet protocol network.

4. The data communication system of claim 3, wherein the virtual interworking trunk interface assigned internet protocol address and the pseudo-medium access control (MAC) address are associated with a virtual router instance interface.

5. The data communication system of claim 1, wherein the virtual interworking trunk interface is treated as a terminating network interface by the virtual router instance.

6. The data communication system of claim 1, wherein the virtual interworking trunk interface is treated as a terminating network interface by the virtual switch instance.

7. The data communication system of claim 1, wherein the virtual router instance is coupled to the virtual interworking trunk interface via a virtual interface of the virtual router instance, and wherein the virtual interface of the virtual router instance represents a subnet of the first portion of the virtual private network.

8. The data communication system of claim 7, wherein the virtual interface of the virtual router instance represents the subnet of the first portion of the virtual private network as an entry in a network routing table.

9. The data communication system of claim 1, wherein the virtual router instance performs internet protocol (IP) to medium access control (MAC) mapping for customer equipment within the first portion of the virtual private network.

10. The data communication system of claim 1, wherein the virtual router instance performs routing between the virtual switch instance of the first portion of the virtual private network and customer equipment within the second portion of the virtual private network.

11. The data communication system of claim 1, wherein the virtual router instance performs bandwidth control of the virtual interworking trunk interface and quality of service management between the first portion of the virtual private network and the second portion of the virtual private network.

12. The data communication system of claim 1, further comprising a virtual interface of the virtual switch instance with respect to the virtual interworking trunk interface, the virtual interface of the virtual switch instance representing shared virtual customer equipment.

13. The data communication system of claim 12, wherein the shared virtual customer equipment includes a representation of a plurality of customer equipment nodes within the second portion of the virtual private network.

14. The data communication system of claim 12, wherein the virtual interface of the virtual switch instance performs medium access control (MAC) learning.

15. The data communication system of claim 12, wherein the virtual interface of the virtual switch instance performs frame forwarding.

16. The data communication system of claim 12, wherein the virtual interface of the virtual switch instance performs bandwidth control of the virtual interworking trunk interface and quality of service management between the first portion of the virtual private network and the second portion of the virtual private network.

17. A virtual interworking trunk interface, the virtual interworking trunk interface comprising:
a first virtual interface to a virtual switch instance associated with a first portion of the virtual private network; and a second virtual interface to a virtual router instance associated with a second portion of the virtual private network;
wherein the virtual switch instance, the virtual interworking trunk interface, and the virtual router instance are within a virtual private network device, wherein the virtual interworking trunk interface is assigned an internet protocol address.

18. The virtual interworking trunk interface of claim 17, wherein the first portion of the virtual private network is a layer two network and the second portion of the virtual private network is a layer three network.

19. The virtual interworking trunk interface of claim 18, wherein the first portion of the virtual private network is an Ethernet switching network and the second portion of the virtual private network is an internet protocol network.

20. The virtual interworking trunk interface of claim 17, wherein the first virtual interface is coupled to the virtual switch instance and the second virtual interface is coupled to the virtual router instance.

21. The virtual interworking trunk interface of claim 17, wherein the first virtual interface represents a shared set of virtual customer equipment.

22. The virtual interworking trunk interface of claim 17, wherein the shared set of virtual customer equipment includes a representation of a plurality of customer equipment nodes within the second portion of the virtual private network.

23. The virtual interworking trunk interface of claim 17, wherein the first virtual interface performs medium access control (MAC) learning and frame forwarding.

24. The virtual interworking trunk interface of claim 17, wherein at least one of the first virtual interface and the second virtual interface performs at least one of bandwidth control of the virtual interworking trunk interface and quality of service management between the first portion of the virtual private network and the second portion of the virtual private network.

25. The virtual interworking trunk interface of claim 17, wherein the virtual interworking trunk interface has an assigned pseudo-medium access control (MAC) address.

26. The virtual interworking trunk interface of claim 17, wherein the first virtual interface and the second virtual interface are located within provider edge equipment of the virtual private network.

27. A method of operating a virtual private network, the method comprising:
receiving data to be communicated at a virtual switch instance associated with a first portion of the virtual private network;
forwarding the data to a virtual interworking trunk interface coupled to the virtual switch instance, wherein the virtual interworking trunk interface has an assigned internet protocol address; and
forwarding the data from the virtual interworking trunk interface to a virtual router instance associated with a second portion of the virtual private network;
wherein the virtual switch instance, the virtual router instance, and the virtual interworking trunk interface are within a device.

28. The method of claim 27, wherein the first portion of the virtual private network is a layer two Ethernet switching network and the second portion of the virtual private network is a layer three internet protocol network.

29. The method of claim 27, further comprising retrieving an entry in a routing table where the entry represents a subnet of the first portion of the virtual private network.

30. The method of claim 27, further comprising performing medium access control (MAC) learning at a virtual interface of the virtual switch instance.

31. A method of operating a virtual private network, the method comprising:
receiving data to be communicated at a virtual router instance associated with a second portion of the virtual private network;
forwarding the data to a virtual interworking trunk interface coupled to the virtual router instance, wherein the virtual interworking trunk interface has an associated internet protocol address; and forwarding the data from the virtual interworking trunk interface to a virtual switch instance associated with a first portion of the virtual private network;

wherein the virtual router instance, the virtual interworking trunk interface, and the virtual switch instance are within a device.

32. The method of claim 31, further comprising performing internet protocol (IP) to medium access control (MAC) mapping for customer equipment within the first portion of the virtual private network at a virtual interface of the virtual router instance.

33. The method of claim 32, wherein the virtual interface of the virtual router instance performs routing between the virtual switch instance of the first portion of the virtual private network and customer equipment within the second portion of the virtual private network.

34. The method of claim 32, wherein the virtual interface of the virtual router instance performs bandwidth control of the virtual interworking trunk interface and quality of service management between the first portion of the virtual private network and the second portion of the virtual private network.

35. A method of using a virtual private network, the method comprising:

performing medium access control learning at a virtual switch instance interface of a virtual interworking trunk interface, wherein the virtual interworking trunk interface has an assigned internet protocol address and an assigned pseudo-medium access control address;

performing layer two frame forwarding at the virtual switch instance interface of the virtual interworking trunk interface; and performing medium access control forwarding;

wherein the virtual switch instance interface, a virtual router instance, and the virtual interworking trunk interface are within a device.

36. The method of claim 35, further comprising performing bandwidth control of the virtual interworking trunk interface and quality of service management between a first portion of the virtual private network and a second portion of the virtual private network.

* * * * *